(12) United States Patent
Wang et al.

(10) Patent No.: US 9,253,767 B2
(45) Date of Patent: Feb. 2, 2016

(54) PSMP-BASED DOWNLINK MULTI-USER MIMO COMMUNICATIONS

(75) Inventors: James June-Ming Wang, San Marino, CA (US); Huanchun Ye, Cupertino, CA (US)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 13/583,739

(22) PCT Filed: Sep. 8, 2011

(86) PCT No.: PCT/US2011/050762
§ 371 (c)(1),
(2), (4) Date: Sep. 10, 2012

(87) PCT Pub. No.: WO2012/033877
PCT Pub. Date: Mar. 15, 2012

(65) Prior Publication Data
US 2013/0188567 A1    Jul. 25, 2013

Related U.S. Application Data

(60) Provisional application No. 61/380,905, filed on Sep. 8, 2010.

(51) Int. Cl.
*H04W 72/04* (2009.01)
*H04W 52/02* (2009.01)
(Continued)

(52) U.S. Cl.
CPC .......... *H04W 72/042* (2013.01); *H04L 5/0023* (2013.01); *H04L 5/0055* (2013.01); *H04L 5/0094* (2013.01); *H04W 52/0209* (2013.01); *H04W 52/0219* (2013.01); *H04B 7/0452* (2013.01); *H04L 25/0204* (2013.01);
(Continued)

(58) Field of Classification Search
None
See application file for complete search history.

(56) References Cited

U.S. PATENT DOCUMENTS 7,672,259 B2     3/2010  Jang
2007/0280116 A1* 12/2007  Wang et al. ................... 370/236
(Continued)

OTHER PUBLICATIONS

H. Singh, H. Shao and C. Ngo, Enhanced Power Saving in Next Generation Wireless LANs, pp. 1-5, 2006.*
(Continued)

*Primary Examiner* — Christopher Crutchfield
(74) *Attorney, Agent, or Firm* — McClure, Qualey & Rodack, LLP

(57) ABSTRACT

A scheduling-based downlink MU-MIMO mechanism is proposed in a wireless communication system. An access point transmits a first scheduling message to a plurality of stations. The first scheduling message reserves a first transmission burst for channel sounding. The AP then transmits a sounding signal and in response receives channel state information (CSI) from the plurality of stations. Based on the CSI, the AP performs MU-MIMO encoding and applies transmit beamforming (precoding). The AP transmits a second scheduling message that reserves a second transmission burst for MU-MIMO transmission. The AP then transmits downlink data streams to multiple stations simultaneously. Finally, the AP receives uplink acknowledgements from the stations. In one embodiment, the scheduling-based MU-MIMO is implemented using PSMP scheduling technique. PSMP-based downlink MU-MIMO allows both 802.11n and 802.11ac stations to process multiple spatial streams with reduced complexity, enhanced performance, and significant power saving.

21 Claims, 8 Drawing Sheets

(51) Int. Cl.
*H04L 5/00* (2006.01)
*H04W 28/26* (2009.01)
*H04W 48/16* (2009.01)
*H04W 52/28* (2009.01)
*H04W 72/12* (2009.01)
*H04W 84/12* (2009.01)
*H04W 88/08* (2009.01)
*H04B 7/04* (2006.01)
*H04L 25/02* (2006.01)
*H04L 25/03* (2006.01)

(52) U.S. Cl.
CPC .......... *H04L25/03891* (2013.01); *H04W 28/26* (2013.01); *H04W 48/16* (2013.01); *H04W 52/287* (2013.01); *H04W 72/1289* (2013.01); *H04W 84/12* (2013.01); *H04W 88/08* (2013.01)

(56) References Cited

U.S. PATENT DOCUMENTS

| | | | |
|---|---|---|---|
| 2007/0297351 | A1 | 12/2007 | Trainin |
| 2009/0225879 | A1 | 9/2009 | Kloos |
| 2010/0260138 | A1* | 10/2010 | Liu et al. ............... 370/330 |
| 2010/0309834 | A1* | 12/2010 | Fischer et al. ......... 370/312 |
| 2010/0322166 | A1* | 12/2010 | Sampath et al. ....... 370/329 |
| 2010/0329195 | A1* | 12/2010 | Abraham et al. ...... 370/329 |

OTHER PUBLICATIONS

J. Wang, H. Ye, A. Hsu, PSMP-Based MU-MIMO Communications, pp. 1-10, Sep. 14, 2010.*
International Search Report and Written Opinion mailed Dec. 30, 2011.

* cited by examiner

METHOD OF PSMP-BAED MU-MIMO FROM AP PERSPECTIVE

PSMP-BASED DOWNLINK MULTI-USER MIMO COMMUNICATIONS

CROSS-REFERENCE TO RELATED APPLICATION

This application is the 35 U.S.C. §371 national stage of, and claims priority to and the benefit of, PCT application PCT/US2011/050762, filed Sep. 8, 2011, which claims priority to and the benefit of U.S. Provisional Application No. 61/380,905, filed on Sep. 8, 2010, herein incorporated by reference in its entirety.

TECHNICAL FIELD

The disclosed embodiments relate generally to wireless network communications, and, more particularly, to Power Save Multi Poll (PSMP)-based downlink multi-user multiple-input multiple-output (MU-MIMO) communications.

BACKGROUND

Multi-user multiple-input multiple-output (MU-MIMO) transmission is becoming a new system technique to enable high system capacity in both the upcoming IEEE 802.11ac and the LTE (long-term evolution) standards. As compared to single-user MIMO (SU-MIMO), MU-MIMO has several key advantages. First, MU-MIMO allows for a direct gain in multiple access system capacity proportional to the number of access point antennas. Second, MU-MIMO allows the higher degree spatial multiplexing gain to be obtained without the need for higher number of antennas at the mobile stations by keeping the intelligence and cost at the access point. Third, MU-MIMO appears immune to most propagation limitations plaguing SU-MIMO communications because multiuser diversity can be extracted even in a simple line of sight (LOS) propagation environment. As a result, the LOS propagation, which causes degradation in single user spatial multiplexing schemes, is no longer a problem in the multiuser setting.

FIG. 1 (Prior Art) illustrates a typical downlink MU-MIMO process adopted by IEEE 802.11ac systems. For a Time-Division Duplexing (TDD) system, it is not possible to simultaneously transmit and receive signals in the access point or router. To avoid simultaneous transmission and reception, all transmitted downlink spatial streams need to end concurrently to preventing any mobile station from transmitting a signal back during the downlink stream transmission. This is accomplished through a process called padding. As illustrated in FIG. 1, the shorter spatial streams (i.e., SS3 for STA 3 and SS2 for STA2) are appended with extra non-information bearing data to fill up the same length as that of the longest spatial stream (i.e., SS1 for STA 1). The process of padding and un-padding the downlink spatial streams at the transmitter and the receiver are stipulated in the IEEE 802.11ac specifications. For uplink transmission, however, although MU-MIMO transmission is possible, it is currently not included in the IEEE 802.11ac specifications due to difficulties in the timing synchronization. Instead, as illustrated in FIG. 1, the multiple mobile stations transmit uplink acknowledgements (i.e., block acknowledge (BA)) sequentially (i.e., separated by SIFS (short interframe space) intervals or RIFS (reduced interframe space) intervals) in response to the MU-MIMO downlink transmission in a scheduled or polled time division multiple access (TDMA) fashion.

In contrast to the SU-MIMO transmission, where the mobile station receivers are equipped with sufficient number of antennas (equal to or greater than the number of spatial streams) and the capability of the signal processing to estimate the channel and to separate the spatial streams, it is crucial in a MU-MIMO transmission for the access points or routers to bear the most of the burden in the signal processing and hardware complexity to allow for simpler mobile station implementation. To achieve this aim, the access point or router should apply transmit beamforming (precoding), computed from channel information acquired in the MU-MIMO downlink transmission to achieve an orthogonal (or near-orthogonal) transmission of multiple streams to multiple users, i.e., eliminating (or reducing) the amount of mutual interference between the transmission to multiple mobile stations. Under this condition, each mobile station only receives the spatial stream(s) intended for itself and not the interference from the spatial stream(s) intended for other mobile stations. With reduced number of spatial streams directed toward individual mobile stations, all mobile stations only need to be equipped with sufficient number of antennas for processing the spatial streams intended for itself and not worrying about eliminating the interference from other spatial streams.

The processing of multiple spatial streams at the receiver is well known to those skilled in the art. In widely deployed IEEE 802.11n systems, low cost mobile stations with SU-MIMO capability are equipped with multiple antennas and the ability to process multiple received spatial streams intended for itself, i.e., the capability for low degree of spatial processing. The commonly used receiver processing algorithms include linear processing such as zero forcing (ZF) or minimum mean square error (MMSE) and more complex nonlinear processing based on maximal likelihood receiver. For SU-MIMO, the transmit beamforming (precoding) can be optionally applied at the transmitter to mitigate the effects of noise enhancement issues in the linear processing receiver thereby enabling the linear receiver to achieve the performance of the maximal likelihood receiver.

Although the legacy 802.11n mobile stations possess the similar capability for processing the received MIMO spatial streams as the 802.11ac mobile station, they do not have the capability to process the padding and un-padding of spatial stream and to handle the scheduled or polled uplink response. This is the key obstacle for performing MU-MIMO to the legacy 802.11n devices. A solution is sought to enable downlink MU-MIMO transmission for both 802.11ac and legacy 802.11n systems to achieve enhanced system capacity.

SUMMARY

A scheduling-based downlink MU-MIMO mechanism is proposed in a wireless communication system. An access point transmits a first scheduling message to a plurality of stations. The first scheduling message reserves a first transmission burst for channel sounding. The AP then transmits a sounding signal and in response receives channel state information (CSI) from the plurality of stations. Based on the CSI, the AP performs MU-MIMO encoding and applies transmit beamforming (precoding). The AP transmits a second scheduling message that reserves a second transmission burst for MU-MIMO transmission. The AP then transmits downlink data streams to multiple stations simultaneously. Finally, the AP receives uplink acknowledgements and/or messages from the stations.

In one embodiment, the scheduling-based MU-MIMO is implemented using PSMP scheduling technique. The proposed invention intends to provide PSMP-based MU-MIMO downlink transmission to legacy 802.11n mobile stations in a novel way by employing the precoding in the access point or router to provide orthogonal or near orthogonal transmission to multiple mobile station to allow for the 802.11n mobile station to only receive the spatial stream(s) intended for itself with none or reduced interference from spatial streams intended for other mobile stations, and also employs the PSMP scheduling mechanism in IEEE 802.11n to arrange the simultaneous downlink MU-MIMO transmission in the PSMP-DTT time slot(s) and uplink transmission from multiple users in scheduled time slots to circumvent the in-ability of the 802.11n mobile stations to do downlink spatial stream padding and scheduled or polled ACK responses in the uplink.

The proposed method is particular suitable for implementing in an IEEE 802.11ac access point or router due to the fact that it is already equipped with the capability to do complex downlink scheduling and precoding and also most likely equipped with higher number of antennas. The 802.11ac access point or router is also capable of handling the legacy 802.11n signal transmission, reception, signaling, and traffic. Adding the proposed method into the 802.11ac access point or router is a simple extension of its capability to enhance system capacity, channel utilization, and efficiency in a system with a mixture of both 802.11ac and 802.11n mobile stations with little or no extra cost. The proposed method, however, does not rule out the possibility of upgrading a PSMP capable and precoding capable 802.11n access point or router design to handle the described PSMP-based MU-MIMO transmission. The novel feature of the disclosed system and apparatus is that no modification or upgrade is required for the legacy 802.11n mobile stations.

The disclosed system and apparatus is capable of achieving high system capacity and low power consumption with low cost stations. The said system and apparatus can also be applied to wider channel bandwidth of the IEEE 802.11ac standard with a new wide band PSMP protocol and waveform. A 80 MHz wide band PSMP frame is introduced by replicating two 40 MHz PSMP frame in each of the IEEE 802.11n 40 MHz sub-channel within the wider IEEE 802.11ac 80 MHz bandwidth to allow reservation of the wider channel in the presence of legacy devices. The disclosed scheme also allows channel sounding and PSMP-based MU-MIMO to be performed within two consecutive PSMP bursts using a single TXOP (transmit opportunity). This approach offers the advantage that no separate channel access is required for channel sounding prior to PSMP-based MU-MIMO and the latency of the channel state information obtained is small.

Other embodiments and advantages are described in the detailed description below. This summary does not purport to define the invention. The invention is defined by the claims.

DETAILED DESCRIPTION

Figure 1:
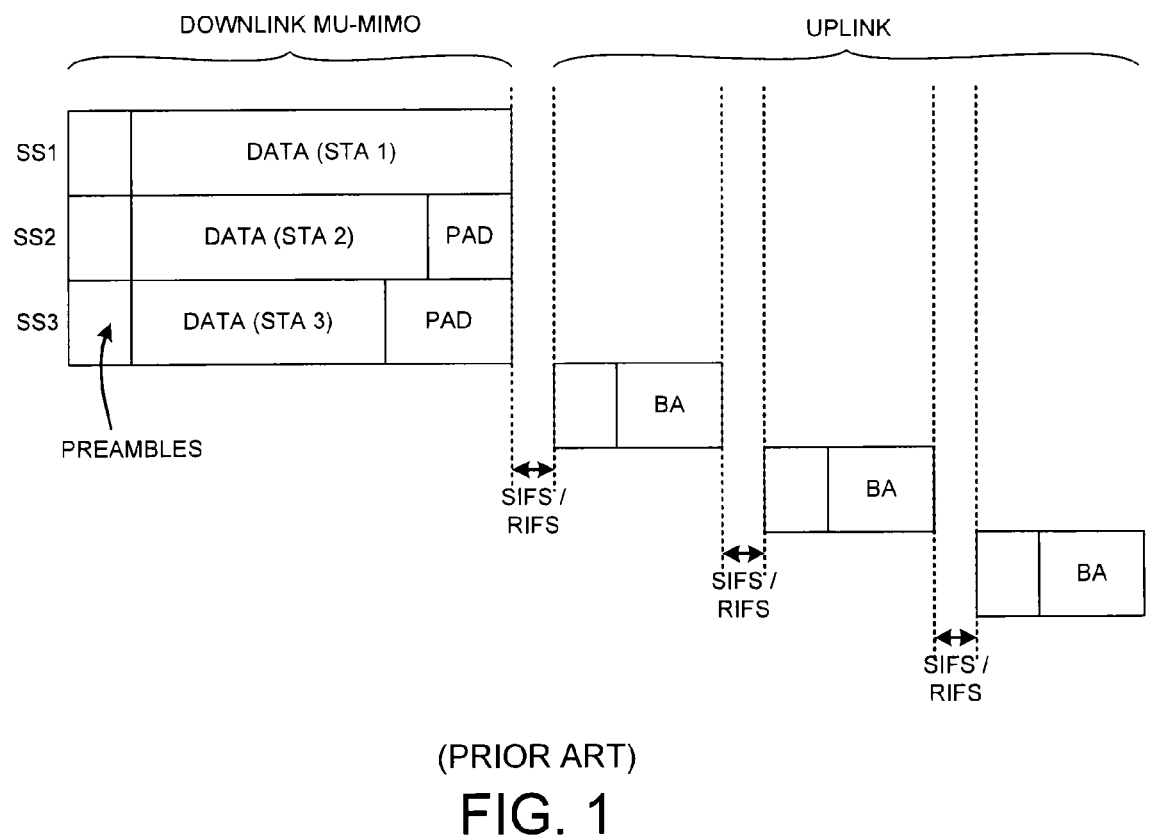
FIG. 1 (prior art) illustrates a typical MU-MIMO process adopted by IEEE 802.11ac systems.

Reference will now be made in detail to some embodiments of the invention, examples of which are illustrated in the accompanying drawings.

A multiple-input multiple-output (MIMO) wireless system employs multiple ($N_T$) transmit antennas and multiple ($N_R$) receive antennas for data transmission. A MIMO channel formed by the $N_T$ transmit and $N_R$ receive antennas may be decomposed into $N_S$ spatial channels, where $N_S \leq \min\{N_T, N_R\}$. The $N_S$ spatial channels are used to transmit $N_S$ independent data streams to achieve greater overall throughput. While single-user MIMO (SU-MIMO) considers access to the multiple antennas that are physically connected to each individual terminal (e.g., user), multi-user MIMO (MU-MIMO) allows a terminal to transmit (or receive) signals to (or from) multiple users simultaneously. The typical MU-MIMO usage scenario in IEEE 802.11ac involves an access point (AP) or router first acquiring the MIMO channel state information (CSI) through channel sounding, computing and applying transmit beamforming (precoding) weights, and then simultaneously transmitting multiple spatial streams to more than one mobile stations (STAs). Without the transmit beamforming (precoding) at the access point or router, mobile stations need to be equipped with the same or more antennas than the number of spatial streams $N_S$ transmitted by the access point or router to all the mobile stations. Therefore, transmit beamforming (precoding) is often employed in MU-MIMO at the transmitter side (e.g., access point (AP) to reduce the degree of the spatial processing at the receiver side (e.g., mobile station (STA)). With proper transmit beamforming (precoding), partial spatial processing is done at the access point to separate the spatial streams among the multiple users, and the remaining spatial processing is done at the receivers to decode the multiple spatial streams received.

In one embodiment, a particular linear algorithm called "block diagonalization" for the transmit beamforming (precoding) processing by "Zero-Forcing Methods for Downlink Spatial Multiplexing in Multi-User MIMO Channels" by Quentin H. Spencer, et al., 2003", based on zero-forcing, MMSE, or successive optimization allows for separating (the blocks of) the spatial streams among multiple users. This provides an example of algorithm to be employed in the proposed system and apparatus for enabling low complexity receivers in MU-MIMO transmission. It should be noted that through such processing the mutual interference of the spatial intended for different receivers are eliminated or reduced and thus the receiver complexity, including the number of receiver antennas, the associated receive processing hardware such as RF and down-conversion chain, baseband filtering, amplification, the gain control circuitry, the analog-to-digital converter (ADC), and the digital processing hardware, can be substantially simplified. It should also be noted that that through such process of eliminating mutual interference, the SU-MIMO capable legacy 802.11n mobile stations could be used in the disclosed PSMP-based downlink MU-MIMO transmission. While the transmit beamforming (precoding) method disclosed can simplify the complexity of the mobile stations, it is, however, not an essential part of the invention.

Figure 2:
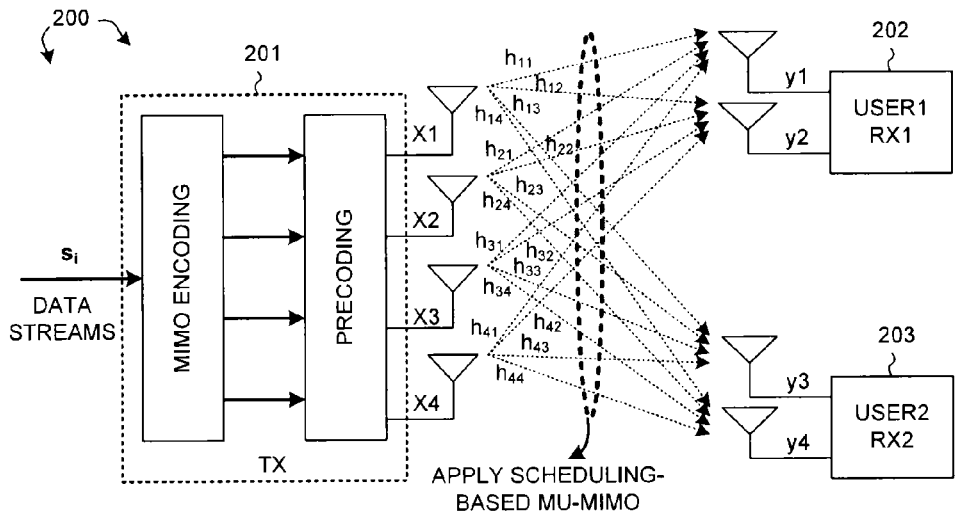
FIG. 2 illustrates a MU-MIMO scheme in a wireless system in accordance with one novel aspect.

FIG. 2 illustrates a scheduling-based MU-MIMO scheme in a wireless system 200 in accordance with one novel aspect. Wireless system 200 comprises an access point AP 201, a first mobile station STA 202 (user 1 or RX1), and a second mobile station STA 203 (user 2 or RX2). In the example of FIG. 2, four spatial streams are transmitted by the TX antennas with two spatial streams intended for each receiver. The coefficients $h_{11}$, $h_{12}$, $h_{13}$, and $h_{14}$ represent the transmission from $x_1$ antenna arriving at $y_1$, $y_2$, $y_3$, and $y_4$ antennas. The coefficients $h_{21}$, $h_{22}$, $h_{23}$, and $h_{22}$ represent the transmission from $x_2$ antenna arriving at $y_1$, $y_2$, $y_3$, and $y_4$ antennas. The coefficients $h_{31}$, $h_{32}$, $h_{33}$, and $h_{32}$ represent the transmission from $x_3$ antenna arriving at $y_1$, $y_2$, $y_3$, and $y_4$ antennas. Finally, the coefficients $h_{41}$, $h_{42}$, $h_{43}$, and $h_{42}$ represent the transmission from $x_4$ antenna arriving at $y_1$, $y_2$, $y_3$, and $y_4$ antennas. The transmission from each of the four TX antennas arrives at each of the four RX antennas. The input-output relationship can be described as:

$$y = Hx + n \quad (1)$$

$$x = \Sigma V_i S_i \quad (2)$$

where
H is the channel response matrix
$V_i$ is the precoder matrix
$s_i$ is the transmit signal
n is the noise If the spatial processing is entirely performed at the receiver, each receiver requires four antennas in order to resolve the mutual coupling of the four spatial streams. To simplify the receiver configuration (namely, to allow each of the receiver to employ only two RX antennas to extract the two spatial streams), the transmit beamforming (precoding) needs to be applied at the transmitter side. The goal of the transmit beamforming (precoding) is to generate desired transmit array antenna patterns such that two spatial streams are beamed toward the first receiver (RX1) while nulled toward the second receiver (RX2) and that the other two spatial streams are beamed toward the second receiver (RX2) while nulled toward the first receiver (RX1). In other words, if precoder matrix $V_i$ is applied properly, then RX1 will only see the first two spatial streams and RX2 will only see the other two spatial streams. As a result, RX1 only needs two antennas to resolve the first two spatial streams while RX2 also only needs two antennas to resolve the other two spatial streams. With the proper transmit beamforming at the transmitter (TX), the overall receive antennas can be reduced from eight to four and a simpler system configuration can be achieved.

Because transmit beamforming (precoding) at the access point provides orthogonal or near orthogonal transmission to multiple mobile station, it allows SU-MIMO-capable legacy 802.11n mobile stations to only receive the spatial stream(s) intended for itself with none or reduced interference from spatial streams intended for other mobile stations. Legacy 802.11n mobile stations, however, are still not able to process MU-MIMO spatial streams. This is because both the transmitter and receiver use the same frequency in IEEE 802.11 systems and simultaneous transmit and receive operation is not feasible in such systems. Padding of spatial streams thus is required in typical operation for downlink transmission. For uplink transmission, scheduled or polled response in a time-division multiple-access (TDMA) fashion is employed. Because the padding of the spatial streams and the scheduled or polled uplink transmission is not supported in the IEEE 802.11n standard, the legacy 802.11n mobile stations cannot process MU-MIMO streams even with proper transmit beamforming.

In one novel aspect, scheduling-based operation (e.g., power save multi-poll (PSMP) from IEEE 802.11n standard) is employed to reserve transmission bursts for scheduled downlink and uplink data transmission such that MU-MIMO spatial streams can be processed by both 802.11ac and legacy 802.11n devices.

Figure 3:
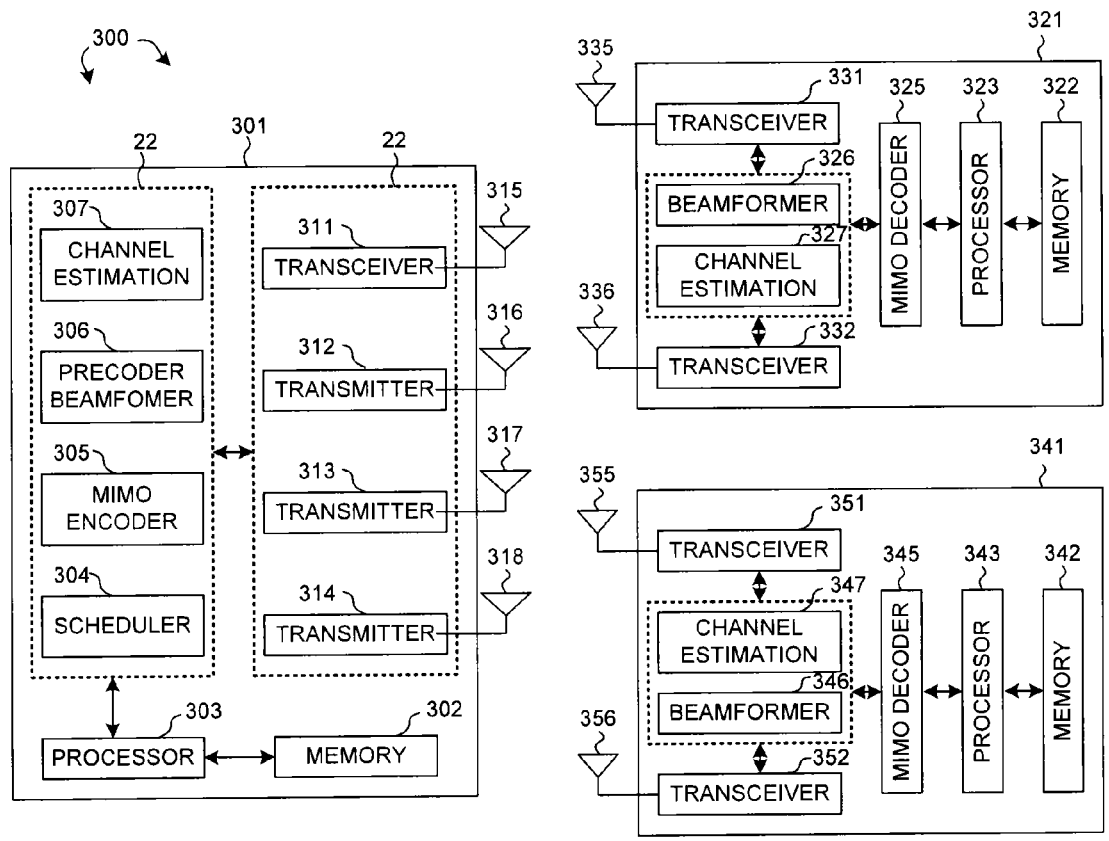
FIG. 3 illustrates simplified block diagrams of an access point and two stations in a wireless system in accordance with one novel aspect.

FIG. 3 illustrates simplified block diagrams of an access point AP 301 and two mobile stations STA 321 and STA 341 in a wireless system 300 in accordance with one novel aspect. AP 301 comprises memory 302, a processor 303, a scheduler 304, a MIMO encoder 305, a beamformer/precoder 306, a channel estimation module 307, and a plurality of transceivers 311-314 coupled to a plurality of antennas 315-318, respectively. STA 321 comprises memory 322, a processor 323, a MIMO decoder 325, a beamformee module 326, a channel estimation module 327, and a plurality of transceivers 331-332 coupled to a plurality of antennas 335-336, respectively. Similarly, STA 341 comprises memory 342, a processor 343, a MIMO decoder 345, a beamformee module 346, a channel estimation module 347, and a plurality of transceivers 351-352 coupled to a plurality of antennas 355-356, respectively.

In one novel aspect, AP 301, STA 321, and STA 322 communicate with each other using scheduling-based transmission to enable downlink MU-MIMO. AP 301 first broadcasts a scheduling message that reserves a MIMO channel for a transmission burst. For downlink transmission, at the transmit side, AP 301 performs MIMO encoding, and applies precoding weights for the spatial streams based on channel state information. AP 301 then schedules multiple spatial streams to be transmitted to multiple stations simultaneously during the scheduled transmission burst. For uplink transmission, STA 321 and STA 341 transmit uplink feedbacks/ACKs back to AP 301 sequentially during the same transmission burst in response to the MU-MIMO spatial streams.

Figure 4:
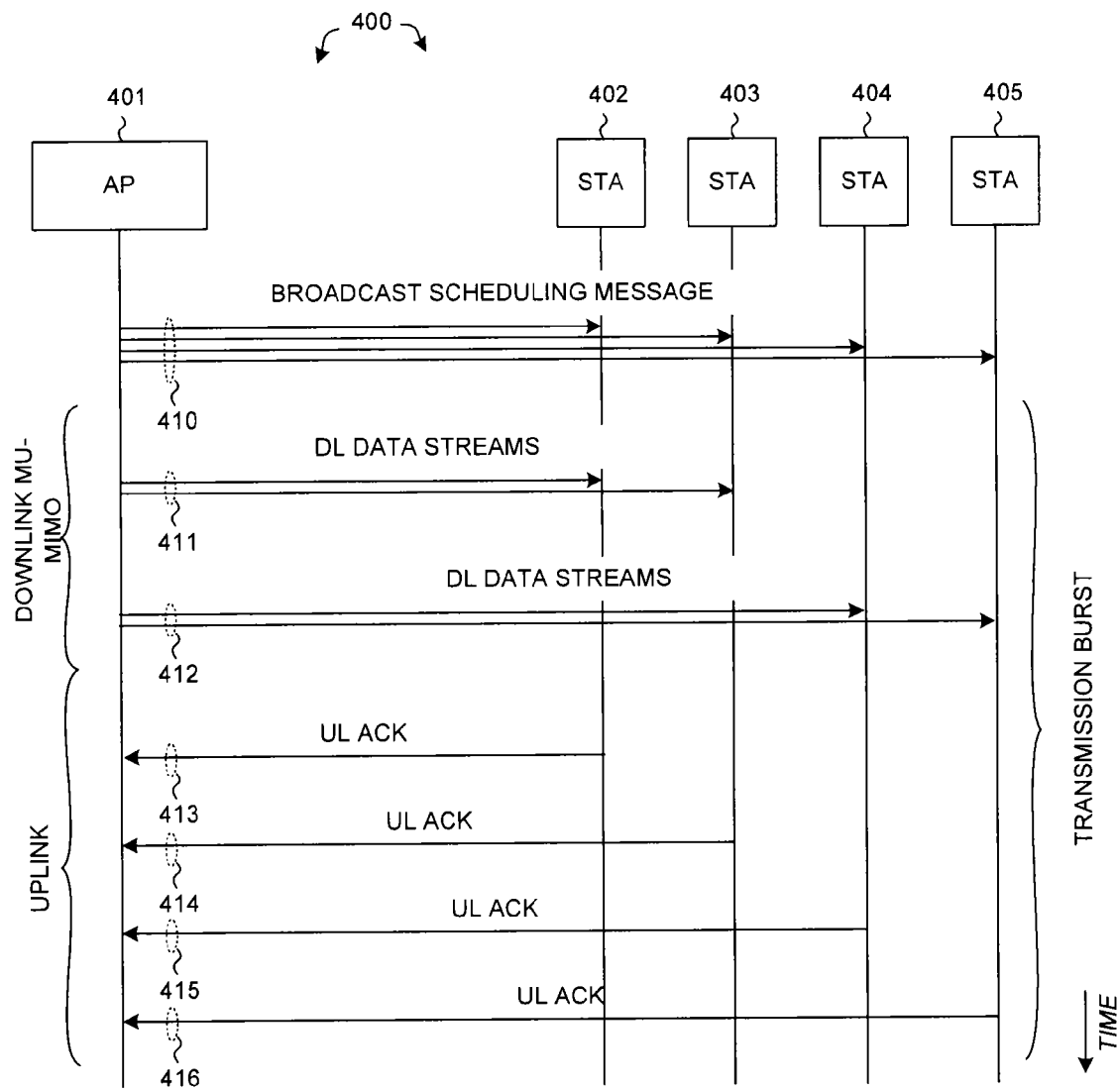
FIG. 4 illustrates a method of downlink MU-MIMO transmission via a scheduled transmission burst.

FIG. 4 illustrates a method of downlink MU-MIMO transmission via a scheduled transmission burst in wireless system 400. Wireless system 400 comprises an AP 401, and a plurality of stations STA 402-405. AP 401 first broadcasts (step 410) a scheduling message that reserves a MIMO channel for a transmission burst. The scheduling message indicates scheduling information to each station transmission periods allocated (pre-assigned) for downlink and uplink transmission during the reserved transmission burst. For downlink transmission, AP 401 transmits multiple data streams to multiple stations simultaneously in MU-MIMO fashion. For example, AP 401 transmits (step 411) DL data streams to STA 402 and STA 403 at a first downlink transmission period, and then transmits (step 412) DL data streams to STA 404 and STA 405 at a second downlink transmission period. On the other hand, for uplink transmission, each mobile station transmits (steps 413-416) UL feedbacks/ACKs sequentially back to AP 401 during corresponding uplink transmission periods. The scheduling-based operation allows legacy 802.11n devices to process MU-MIMO spatial streams without the need of spatial stream padding and un-padding.

In one embodiment, the scheduling-based MU-MIMO is implemented using power-save multi-poll (PSMP) scheduling technique. PSMP is introduced in IEEE 802.11n to optimize channel access and, thus, power consumption for devices by providing the downlink and uplink scheduled transmission information at the start of a PSMP phase so that individual stations can shut down their receivers until needed in the downlink phase and transmit when scheduled during the uplink phase without performing CCA (clear channel assessment). Channel access is optimized by grouping downlink transmissions and scheduling uplink transmissions to follow each other immediately with the corresponding transmission timing offsets broadcast in a single PSMP announcement frame.

Figure 5:
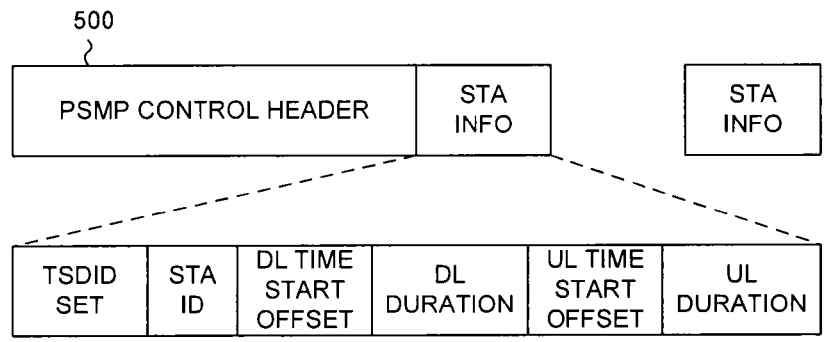
FIG. 5 illustrates a PSMP announcement frame used for PSMP-based downlink MU-MIMO transmission.

FIG. 5 illustrates a PSMP announcement frame 500 used for PSMP-based MU-MIMO transmission. PSMP uses a single PSMP announcement frame to schedule multiple stations for both downlink and uplink transmission. In a PSMP burst transmission, a transmission channel is reserved by setting Duration/ID fields in the PSMP announcement, or other protection frames preceeding the PSMP announcement such as RTS, CTS, CTS-to-self, etc., to values that are no less than the time required to complete all PSMP downlink transmission time (PSMP-DTT) and PSMP uplink transmission time (PSMP-UTT) periods described in the PSMP announcement. In the example of FIG. 5, PSMP announcement frame 500 contains a PSMP control header followed by a plurality of STA information filed. Each STA information field contains STA identification (STA ID) that identifies a corresponding mobile station. Each STA information field also contains timing information of DL and UL start time offset, and scheduled PSMP-DTT periods and scheduled PSMP-UTT periods. Based on the information in each STA info field, each STA can determine exactly when to go to sleep and when to wake up for data communications. The Duration/ID field in the PSMP announcement allows legacy 802.11n devices for scheduled channel access within the PSMP burst for the selected mobile stations. It should be noted that in IEEE 802.11n standard there are both scheduled-PSMP and unscheduled PSMP, providing the flexibility to handle different type of user traffic.

Figure 6:
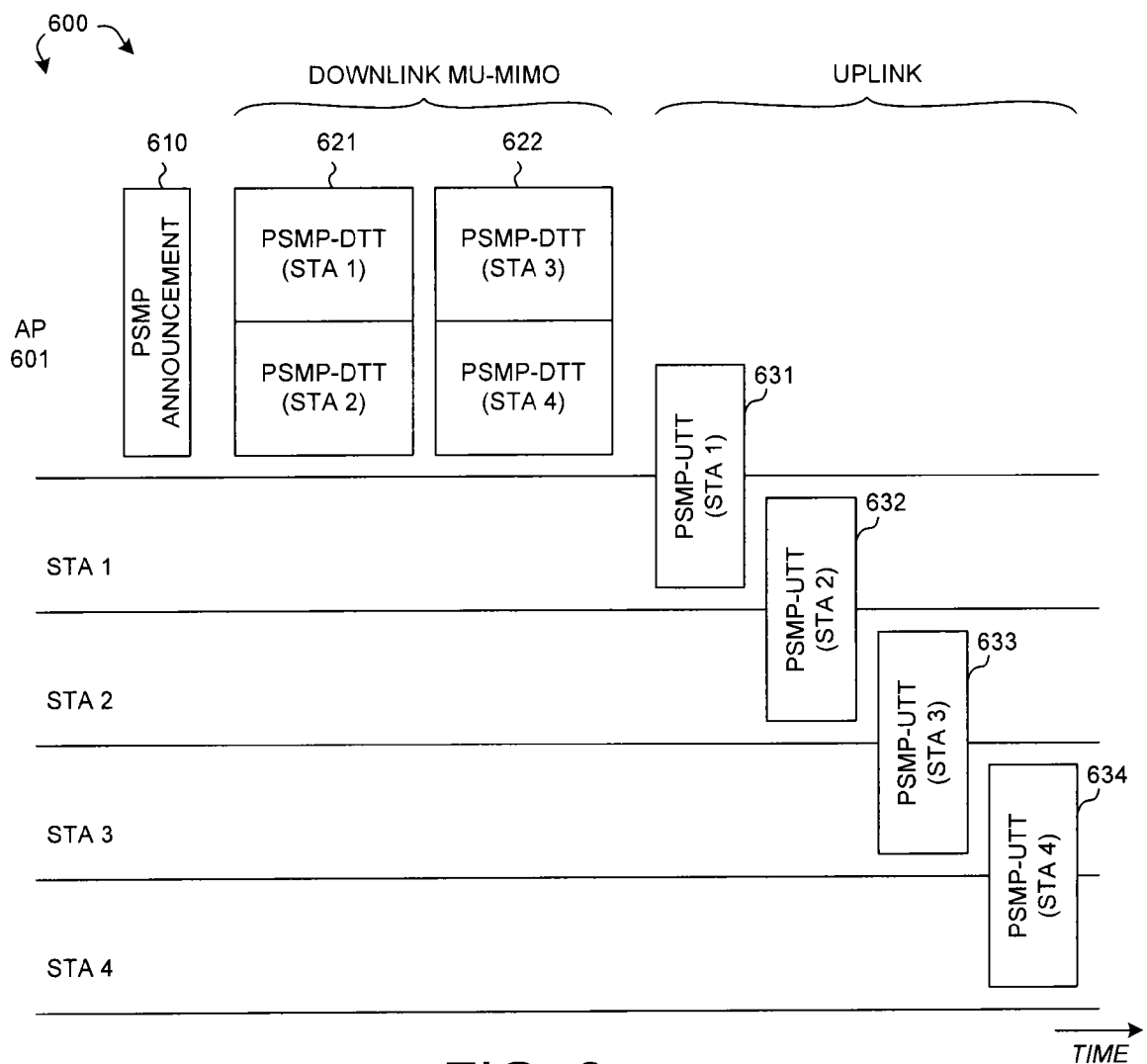
FIG. 6 illustrates a PSMP-based downlink MU-MIMO transmission with corresponding uplink transmission.

FIG. 6 illustrates a PSMP-based downlink MU-MIMO transmission with corresponding uplink transmission in a wireless system 600. Wireless system 600 comprises an AP 601, and a plurality of stations STA1-STA4. AP 601 first broadcasts a PSMP announcement frame 610 that reserves a transmission channel for an entire PSMP burst duration. The PSMP burst includes pre-assigned transmission periods for both downlink and uplink transmission. During downlink MU-MIMO, AP 601 transmits data streams to STA1 and STA2 at a first scheduled PSMP-DTT period 621, and transmits data streams to STA3 and STA4 at a second scheduled PSMP-DTT period 622. During uplink transmission, STA1 transmits an UL ACK at a first scheduled PSMP-UTT period 631, STA2 transmits an UL ACK at a second scheduled PSMP-UTT period 632, STA3 transmits an UL ACK at a third scheduled PSMP-UTT period 633, and STA4 transmits an UL ACK at a fourth scheduled PSMP-UTT period 634.

With PSMP, the downlink MU-MIMO transmission can be performed during the PSMP-DTT time slots without the need of spatial stream padding and the uplink transmission from the selected mobile stations are scheduled. In addition, with appropriate transmit beamforming (precoding) as described above applied at the AP and the beginning of each PSMP-DTT time slot for the PSMP-based MU-MIMO transmission, the legacy 802.11n mobile stations can simply perform the MU-MIMO receiver processing in exactly the same way as the SU-MIMO reception in IEEE 802.11n. Therefore, the combination of using PSMP scheduling mechanism with reduced complexity MU-MIMO technique allows the PSMP-based MU-MIMO transmission for legacy 802.11n mobile stations to achieve enhanced system capacity.

It should be noted that since the 802.11n mobile stations perform the same SU-MIMO operation in the proposed scheme, no change is required for the 802.11n mobile stations, thus the proposed scheme can be applied to the large installed base of the legacy 802.11n mobile stations. This also means that regardless of how many spatial streams the access point or router transmits at the same time, the mobile stations only process the number of spatial streams intended for itself. It should also be noted that since the 802.11ac mobile stations are able to operate in 802.11n mode, the proposed scheme allows the PSMP-based MU-MIMO transmission to 802.11ac mobile stations operating in 802.11n mode. Additional processing or capability may be required at the access point or router beyond those already required in the IEEE 802.11ac standard.

Furthermore, the PSMP scheduling mechanism can be used for the conservation of power consumption in the mobile stations. When the mobile stations receive the PSMP announcement, the stations selected receive or transmit through the pre-assigned time slots and the stations not selected back off from transmission until the end of the PSMP burst. Within the PSMP burst duration, CCA mechanism is not performed, which allows some mobile stations to go to sleep to conserve power. Scheduled PSMP allows the mobile stations to realize significant power saving by waking up only during the PSMP announcement frame and the pre-assigned time slots.

For MU-MIMO transmission, an access point needs to apply beamforming at the AP's antenna array by calculating complex transmit precoding weights based on channel state information (CSI) received from the mobile stations. To obtain complete channel information between the AP and the multiple mobile stations, channel sounding to each of the multiple mobile stations should be performed before MU-MIMO transmission. Channel sounding is a signaling mechanism where the AP (the beamformer) transmits sounding signals on a downlink channel. In response, each mobile station (the beamformee) performs channel measurement and channel estimation, and then sends the estimated CSI back to the AP. In one novel aspect, it is proposed that channel sounding is performed via scheduling-based transmission mechanism followed by scheduling-based MU-MIMO transmission.

Figure 7:
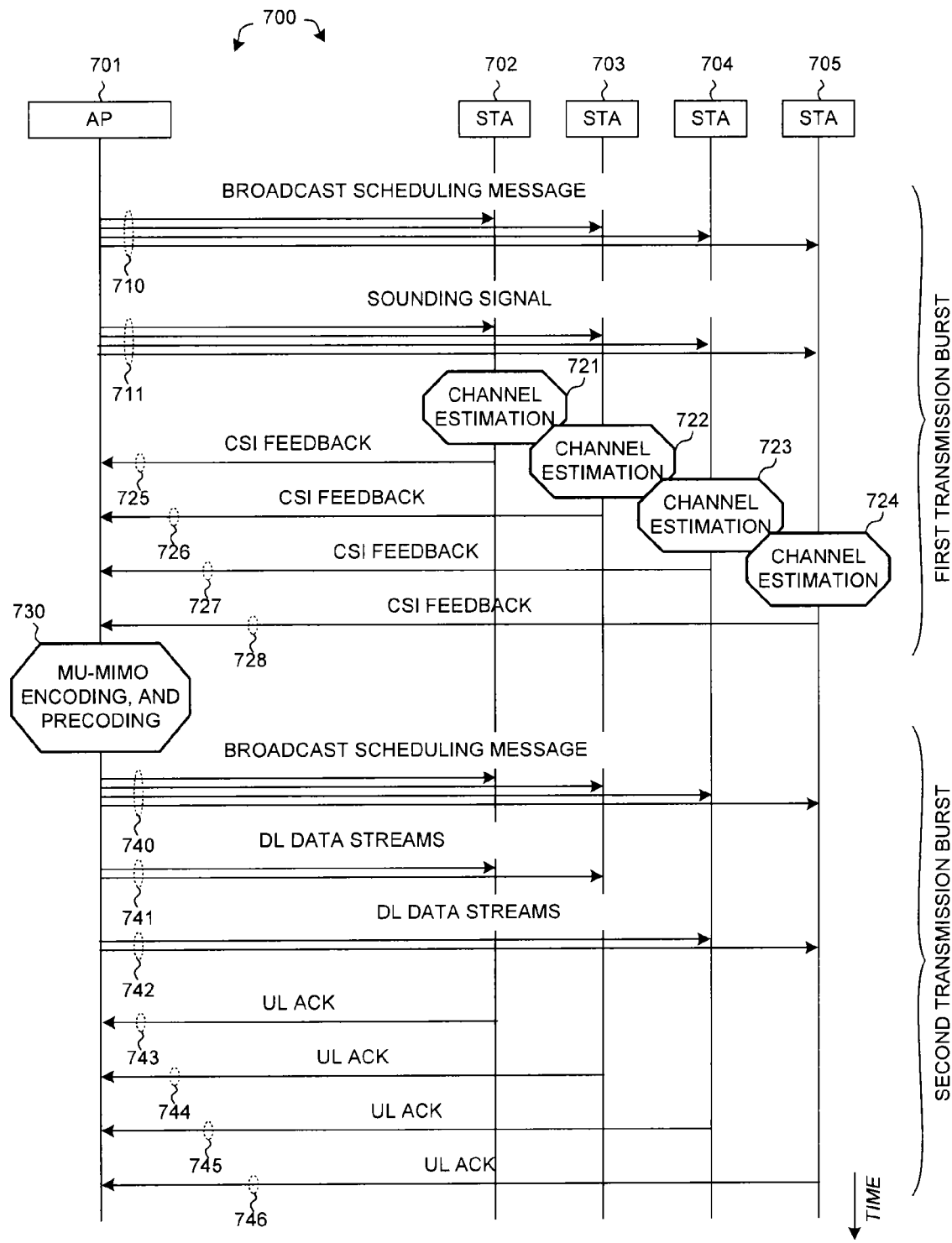
FIG. 7 illustrates a method of channel sounding and downlink MU-MIMO transmission via consecutive scheduled transmission bursts.

FIG. 7 illustrates a method of channel sounding and downlink MU-MIMO transmission via consecutive scheduled transmission bursts in wireless system 700. Wireless system 700 comprises an AP 701, and a plurality of stations STA 702-705. AP 701 broadcasts (step 710) a first scheduling message that reserves a first transmission burst for channel sounding. The first scheduling message indicates scheduling information to each station transmission periods allocated for downlink and uplink transmission during the reserved first transmission burst. For downlink transmission, AP 401 transmits (step 711) sounding signals to STA 702-705 at a scheduled downlink transmission period. Based on the received sounding signals, each station measures the downlink channel and estimates CSI (step 721-724). For uplink transmission, each station transmits (steps 725-728) the CSI feedback information sequentially during corresponding uplink transmission periods.

Based on the estimated CSI from the mobile stations, AP 701 is then able to calculate (step 730) precoding weights to be applied in transmit beamforming for downlink MU-MIMO transmission. Immediately following the first transmission burst for channel sounding, AP 701 broadcasts (step 740) a second scheduling message that reserves a second transmission burst for downlink MU-MIMO. The second scheduling message indicates scheduling information to each station transmission periods allocated for downlink and uplink transmission during the reserved second transmission burst. For downlink transmission, AP 701 transmits multiple data streams to multiple stations simultaneously in MU-MIMO fashion. For example, AP 701 transmits (step 741) DL data streams to STA 702 and STA 703 at a first downlink transmission period, and then transmits (step 742) DL data streams to STA 704 and STA 705 at a second downlink transmission period. On the other hand, for uplink transmission, each mobile station transmits (steps 743-746) UL ACKs or other messages sequentially during corresponding uplink transmission periods.

In one embodiment, it is proposed that PSMP can be used to schedule the channel sounding and CSI feedback for the mobile stations prior to the PSMP burst for PSMP-based MU-MIMO. This approach offers the advantage that no separate TXOP (transmit opportunity) is required for channel sounding prior to PSMP. A TXOP is an interval of time when an STA has the right to initiate frame exchange sequences onto the wireless medium. A TXOP is defined by a starting time and a maximum duration. A TXOP is either obtained by the STA by successfully contending for the channel or assigned by an AP. For example, with an AP, there is a logical entity called hybrid coordinator that can assign some channel time to a particular station. The approach of scheduling two consecutive PSMP bursts in a single TXOP reduces the number of channel accesses for channel sounding/CSI feedback and PSMP-based MU-MIMO, and thus ensures that the latency of the channel information obtained is low for high performance (fast adaptation) MU-MIMO operation. In two consecutive PSMP bursts, the first PSMP is used to perform channel sounding and CSI feedback and the second PSMP burst is used for the PSMP-based MU-MIMO transmission. The two PSMP bursts are concatenated in time in a single TXOP using a flag carried by the PSMP announcement frame.

Figure 8:
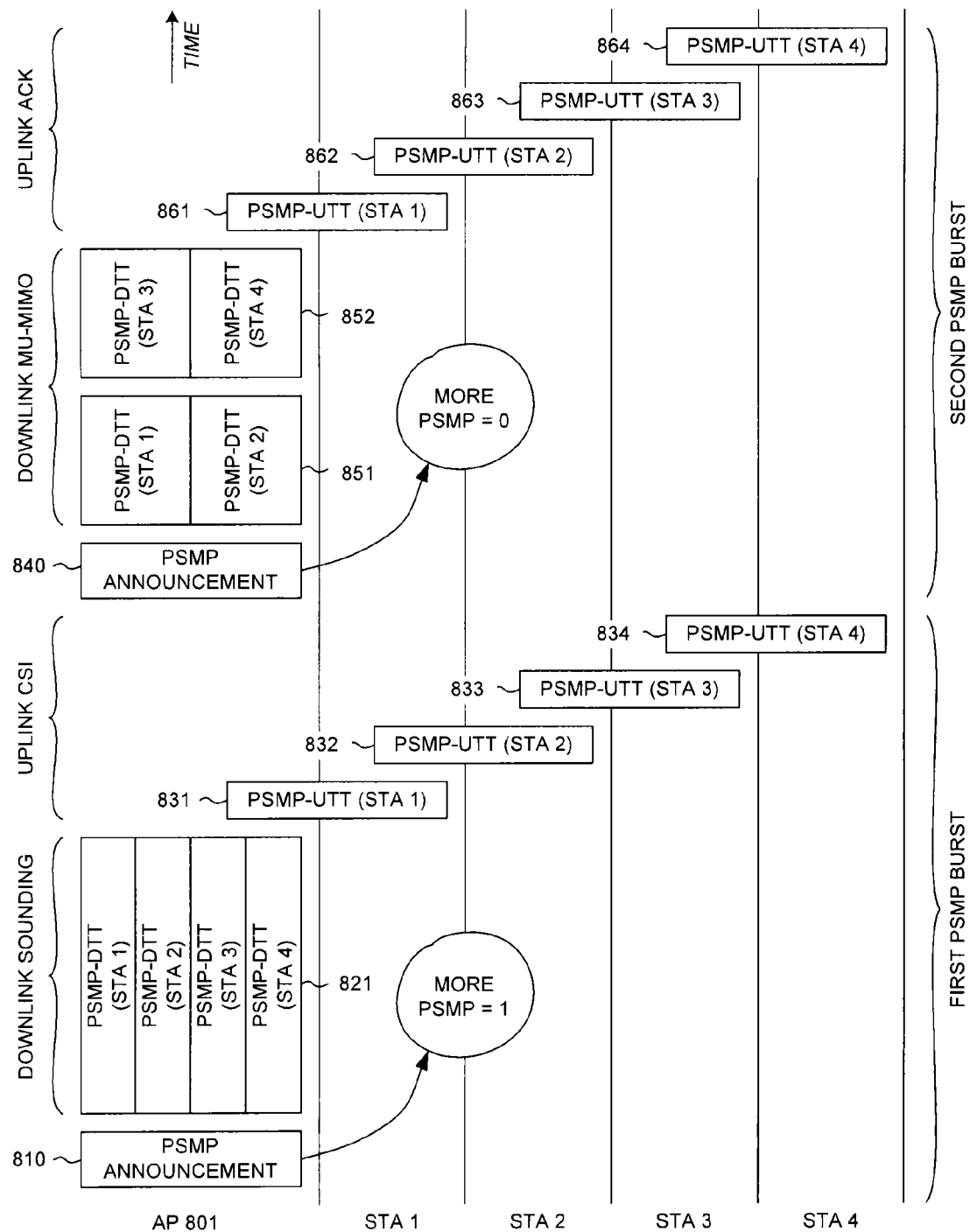
FIG. 8 illustrates a PSMP burst for channel sounding and feedback followed by a PSMP burst for downlink MU-MIMO transmission.

FIG. 8 illustrates a PSMP burst for channel sounding followed by a PSMP burst for MU-MIMO transmission in wireless system 800. Wireless system 800 comprises an AP 801, and a plurality of stations STA1-STA4. AP 801 broadcasts a first PSMP announcement frame 810 (e.g., a null data packet announcement (NDPA) frame) that reserves a transmission channel for a first PSMP burst duration for channel sounding. The first PSMP burst includes pre-assigned transmission periods for both downlink sounding and uplink feedback. During downlink sounding, AP 801 transmits sounding signals (e.g., in an NPD) to STA1-STA4 at a scheduled PSMP-DTT period 821. During uplink feedback, STA1 transmits CSI feedback info (e.g., in a VHT compressed beamforming response frame) at a first scheduled PSMP-UTT period 831, STA2 transmits CSI feedback info at a second scheduled PSMP-UTT period 832, STA3 transmits CSI feedback info at a third scheduled PSMP-UTT period 833, and STA4 transmits CSI feedback info at a fourth scheduled PSMP-UTT period 834.

The first PSMP burst for channel sounding is followed by a second consecutive PSMP burst for MU-MIMO. The existence of a consecutive PSMP burst is indicated in the first PSMP announcement 810. For example, a flag called "More PSMP" is set to value "1" if there is consecutive PSMP. Otherwise, the "More PSMP" flag is set to value "0". In the example of FIG. 8, the "More PSMP" flag in PSMP announcement 810 is set to value "1". As a result, AP 801 broadcasts a second PSMP announcement frame 840 that reserves the transmission channel for a second PSMP burst duration. The second PSMP burst includes pre-assigned transmission periods for downlink MU-MIMO and uplink acknowledgement. During downlink MU-MIMO, AP 801 transmits data streams to STA1 and STA2 at a first scheduled PSMP-DTT period 851, and transmits data streams to STA3 and STA4 at a second scheduled PSMP-DTT period 852. During uplink acknowledgement, STA1 transmits an UL ACK at a first scheduled PSMP-UTT period 861, STA2 transmits an UL ACK at a second scheduled PSMP-UTT period 862, STA3 transmits an UL ACK at a third scheduled PSMP-UTT period 863, and STA4 transmits an UL ACK at a fourth scheduled PSMP-UTT period 864. Because there is no more PSMP transmission, the "More PSMP" flag in PSMP announcement 840 is set to value "0".

The PSMP scheduling mechanism in IEEE 802.11n can be extended to handle the wideband transmission in IEEE 802.11ac by using a new waveform. The disclosed new waveform for a wider (80 MHz or 160 MHz) bandwidth 802.11ac channel replicates multiple of the 40 MHz 802.11n PSMP waveforms in each of the 40 MHz sub-channels. Such replication of waveform allows the legacy devices to understand that the PSMP frame is being used and the wider channel is reserved for the PSMP duration. With such extension of the PSMP to the high bandwidth channel in 802.11ac, the high bandwidth PSMP-based MU-MIMO is also enabled in the PSMP duration in the same way described in the previous paragraphs. With such extension, the PSMP transmission in either PSMP-based MU-MIMO or SU-MIMO or non-MIMO to the legacy 802.11n stations is still feasible because the 802.11n stations are capable of understand such format. Additionally, the PSMP transmission in either PSMP-based MU-MIMO or SU-MIMO or non-MIMO to a mixture of 802.11n stations or 802.11ac stations is feasible. It should be noted that whether the access point or router wants to use PSMP to transmit to a mixture of 802.11n and 802.11ac mobile stations or not is entirely the choice of the access point or router. Some access point or router implementers might choose not to support simultaneous transmission to a mixture of 802.11n and 802.11ac mobile stations to simplify the implementation.

Figure 9:
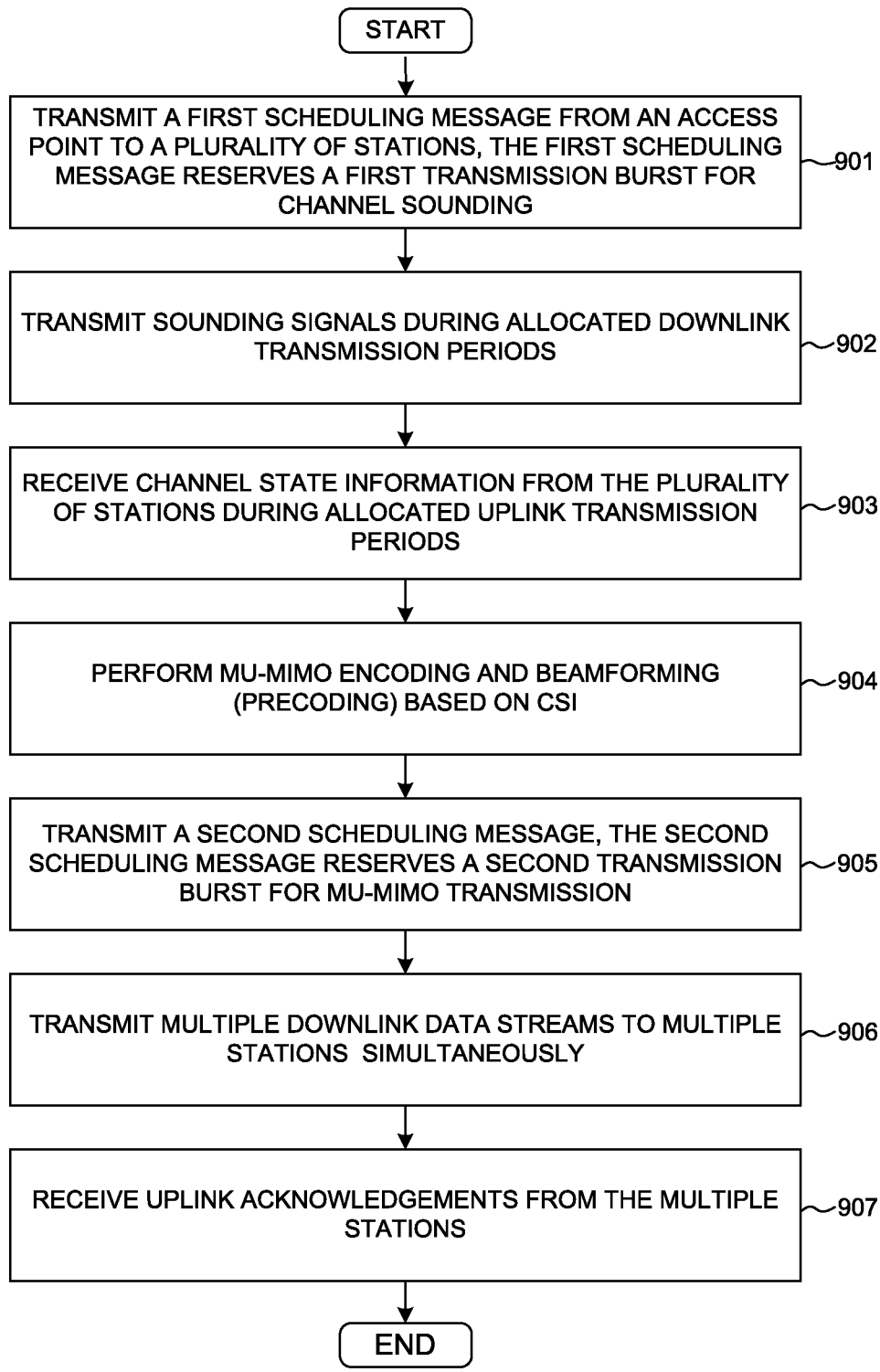
FIG. 9 is a flow chart of a method of scheduling-based MU-MIMO from AP perspective.

FIG. 9 is a flow chart of a method of scheduling-based channel sounding and MU-MIMO from access point perspective in accordance with one novel aspect. In step 901, an AP broadcasts a first scheduling message to a plurality of mobile stations. The first scheduling message reserves a first transmission burst for channel sounding. In step 902, the AP transmits sounding signals to the mobile stations during pre-assigned downlink transmission periods. In step 903, the AP receives CSI feedback information from the mobile stations during pre-assigned uplink transmission periods. In step 904, the AP performs MU-MIMO encoding and applies beamforming (precoding) weights based on the CSI feedback information. In step 905, the AP broadcasts a second scheduling message to the plurality of mobile stations. The second scheduling message reserves a second transmission burst for MU-MIMO transmission. In step 906, the AP transmits multiple data streams to multiple stations simultaneously during pre-assigned downlink transmission periods. Finally, in step 907, the AP receives uplink acknowledgements from the mobile stations during pre-assigned uplink transmission periods.

Figure 10:
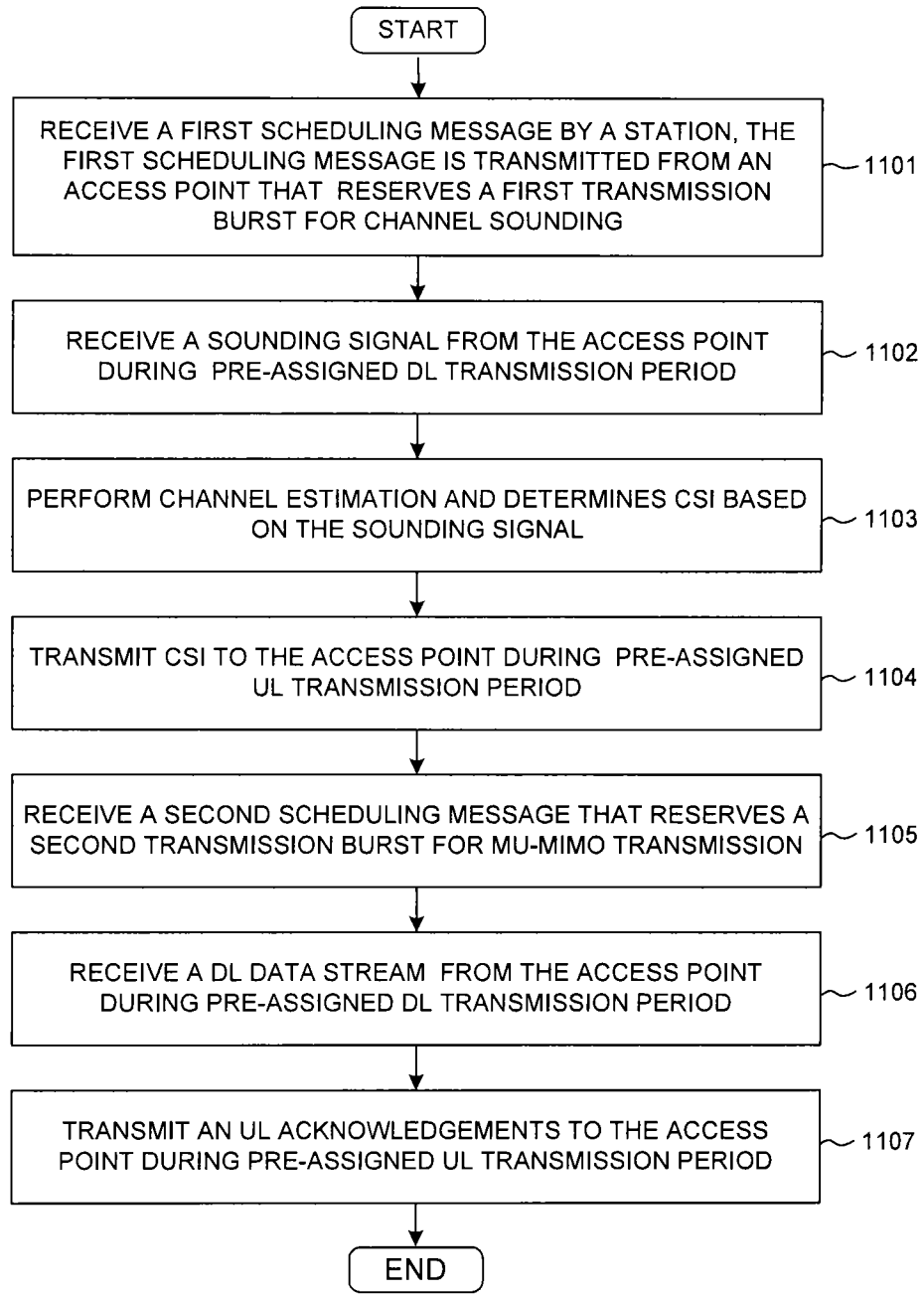
FIG. 10 is a flow chart of a method of scheduling-based MU-MIMO from STA perspective.

FIG. 10 is a flow chart of a method of scheduling-based channel sounding and MU-MIMO from mobile station perspective in accordance with one novel aspect. In step 1101, a mobile station receives a first scheduling message transmitted from an AP that reserves a first transmission burst for channel sounding. In step 1102, the mobile station receives a sounding signal from the AP during a pre-assigned downlink transmission period. In step 1103, the mobile station performs channel estimation and determines CSI based on the sounding signal.

In step 1104, the mobile station transmits the CSI to the AP during a pre-assigned uplink transmission period. In step 105, the mobile station receives a second scheduling message from the AP that reserves a second transmission burst for MU-MIMO transmission. In step 1106, the mobile station receives multiple data streams from the access point during a pre-assigned downlink transmission period. Finally, in step 1107, the mobile station transmits uplink acknowledgements to the AP during a pre-assigned uplink transmission period.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   (a) transmitting from an access point a first scheduling message followed by a sounding message from the access point to a plurality of stations, wherein the first scheduling message reserves a first transmission burst in a wireless network, and the first scheduling message provides scheduling information to each of the plurality of stations specifying transmission periods allocated for downlink and uplink transmission during the reserved first transmission burst;
   (b) receiving from the plurality of stations channel estimation information measured by each of the plurality of stations during the first transmission burst based on the sounding message;
   (c) transmitting a second scheduling message that reserves a second transmission burst for multi-user multiple-input multiple-output (MU-MIMO) transmission, and the second scheduling message provides scheduling information to each of the plurality of stations specifying transmission periods allocated for downlink and uplink transmission during the reserved second transmission burst, wherein the access point transmits downlink data streams without processed by padding to multiple stations simultaneously based on the channel estimation information, and the access point performs MU-MIMO precoding on the downlink data streams transmission to enable each of the multiple stations only receives a portion of the downlink data streams which is intended for itself; and
   (d) receiving uplink acknowledgements from the plurality of stations during each station's allocated time of the second transmission burst.

2. The method of claim 1, wherein the first scheduling message indicates that the first transmission burst is followed by the second transmission burst.

3. The method of claim 1, wherein the access point performs MU-MIMO precoding based on precoding weights calculated from the channel estimation information before transmitting the downlink data streams in (c).

4. The method of claim 1, wherein at least one of the first and the second scheduling message is a power saving multi poll (PSMP) announcement that reserves a PSMP burst.

5. The method of claim 4, wherein each of the plurality of stations operates in a low power consumption mode, and wherein each station remains asleep during transmission periods allocated to other stations.

6. The method of claim 4, wherein the PSMP announcement is transmitted in a wider band PSMP waveform by duplicating multiple narrower band PSMP waveforms.

7. The method of claim 1, wherein the reserved first transmission burst and the reserved second transmission burst are scheduled in a single TXOP.

8. A wireless AP device, comprising:
   a scheduler circuit that reserves consecutive transmission bursts via a first and a second scheduling messages for multi-user multiple-input multiple-output (MU-MIMO) transmission for a plurality of stations in a wireless network, wherein each of the first and second scheduling messages provides scheduling information to each of the plurality of stations specifying transmission periods allocated for downlink and uplink transmission during the reserved transmission bursts;
   a transceiver that transmits sounding messages and receives channel estimation information from the plurality of stations during a first transmission burst, wherein the channel estimation information is received from each of the plurality of stations during the period allocated for that station within the first transmission burst; and
   a MU-MIMO encoder circuit that encodes multiple downlink data streams without processed by padding to be transmitted to multiple stations simultaneously based on the channel estimation information during a second transmission burst, and receiving acknowledgments from each of the plurality of stations during the period allocated for that station within the second transmission burst; and
   a precoder circuit that performs MU-MIMO precoding on the downlink data streams transmission to enable each of the multiple stations only receives a portion of the multiple downlink data streams which is intended for itself.

9. The device of claim 8, wherein the first scheduling message indicates that the first transmission burst is followed by the second transmission burst.

10. The device of claim 8, wherein the precoder circuit that performs MU-MIMO precoding based on precoding weights calculated from the received channel estimation information before transmitting the downlink data streams.

11. The device of claim 8, wherein at least one of the first and the second scheduling message is a power saving multi poll (PMSP) announcement that reserves a PMSP burst.

12. The device of claim 11, wherein each of the plurality of stations operates in a low power consumption mode, and wherein each station remains asleep during transmission periods allocated to other stations.

13. The device of claim 11, wherein the PSMP announcement is transmitted in a wider band PSMP waveform by duplicating multiple narrower band PSMP waveforms.

14. The device of claim 8, wherein the consecutive transmission bursts are scheduled in a single TXOP.

15. A method, comprising:
   receiving a first scheduling message by a station, wherein the first scheduling message is transmitted from an access point and reserves a first transmission burst in a wireless network, and the first scheduling message provides scheduling information to each of the plurality of stations specifying transmission periods allocated for downlink and uplink transmission during the reserved first transmission burst;
   receiving a sounding signal from the access point during the first transmission burst, and in response transmitting estimated channel information, measured by the station based on the sounding message, to the access point during the first transmission burst;
   receiving a second scheduling message that reserves a second transmission burst for multi-user multiple-input multiple-output (MU-MIMO) data transmission, the second scheduling message provides scheduling information specifying a transmission period allocated for downlink and uplink transmission during the reserved second transmission burst;

receiving a downlink MU-MIMO data stream without processed by padding from the access point during the second transmission burst during the period allocated for the station in the reserved second transmission burst, wherein the downlink MU-MIMO data stream is a MU-MIMO precoded stream by the access point, wherein MU-MIMO precoding is used for enabling each of multiple stations only receives a portion of multiple downlink data streams which is intended for itself, and the multiple downlink data streams are transmitted simultaneously; and responsive to receiving the downlink MU-MIMO data stream, transmitting an uplink acknowledgment to the access point during the period allocated for the station in the second transmission burst.

16. The method of claim 15, wherein the first scheduling message indicates that the first transmission burst is followed by the second consecutive transmission burst.

17. The method of claim 15, wherein the station operates in IEEE 802.11ac mode.

18. The method of claim 15, wherein the station operates in IEEE 802.11n mode.

19. The method of claim 15, wherein at least one of the first and the second scheduling message is a power saving multi poll (PSMP) announcement that reserves a PSMP burst.

20. The method of claim 19, wherein the station operates in a low power consumption mode, and wherein the station remains asleep during transmission periods allocated to other stations.

21. The method of claim 19, wherein the PSMP announcement is transmitted in a wider band PSMP waveform by duplicating multiple narrower band PSMP waveforms.

* * * * *